No. 872,463. PATENTED DEC. 3, 1907.
B. A. SCHWABE.
HOSE COUPLING.
APPLICATION FILED APR. 14, 1906.

Inventor
B. A. Schwabe

Witnesses
G. R. Thomas
F. C. Jones

By Chandler & Chandler
Attorneys

UNITED STATES PATENT OFFICE.

BERNHARD A. SCHWABE, OF ABRAMS, WISCONSIN.

HOSE-COUPLING.

No. 872,463.　　　　Specification of Letters Patent.　　　　Patented Dec. 3, 1907.

Application filed April 14, 1906. Serial No. 311,740.

*To all whom it may concern:*

Be it known that I, BERNHARD A. SCHWABE, a citizen of the United States, residing at Abrams, in the county of Oconto, State of Wisconsin, have invented certain new and useful Improvements in Hose-Couplings; and I do hereby declare the following to be a full, clear, and exact description of the invention, such as will enable others skilled in the art to which it appertains to make and use the same.

This invention relates to improvements in hose couplings, the general object thereof being to provide a simple and effective means for coupling hose sections in such a manner as to form tight joints, readily assembled or disassembled.

More particularly the invention includes the use of a pair of coupling disks provided on their inner faces with an alternate series of slots and studs, the studs on one disk being interlocked in the slots on the opposite disk.

The invention also includes the use of a spring pressed bolt carried by one of the disks and extending through one of its slots to retain the corresponding stud of the opposite disk in locked position therein.

Figure 1:
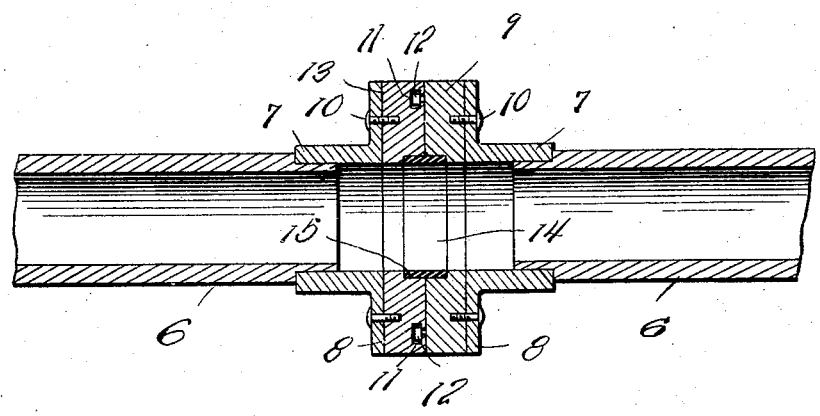
Figure 2:
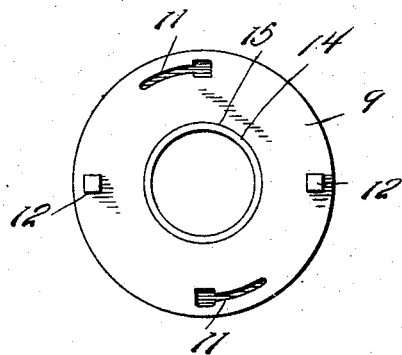
Figure 3:
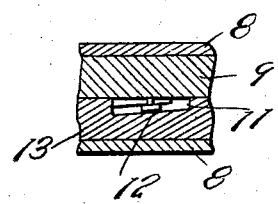
Figure 4:
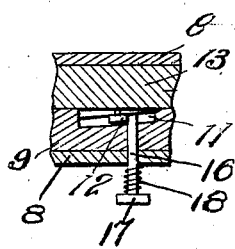

With these and other objects in view, the invention consists in the construction, combination and arrangement of parts all as hereinafter fully described and illustrated in the accompanying drawings, in which Figure 1 is a longitudinal vertical section through the joint, taken approximately on the line 2—2. Fig. 2 is a front elevation of one member of the coupling. Fig. 3 is a sectional view on an enlarged scale showing the arrangement of one of the locking studs in its respective slot. Fig. 4 is a similar detail of the spring locking bolt.

Like reference numerals designate corresponding parts in the several views.

Referring to the drawings, 6 designates one end of a hose section provided with a metallic sleeve 7 having an integral flange 8. A coupling disk 9 is attached to said sleeve by means of bolts 10 passing through said disk and said flange.

The inner face of said disk is provided with a series of alternate key-hole slots 11 and studs 12. In the present instance each disk is shown as having two slots and two studs, the slots having oppositely inclined internal ways and the studs having square heads.

The inner face of the opposite coupling member or disk 13 is provided with a similar arrangement of studs and slots interlocking with those on disk 9 and said disk 13 is likewise attached by means of bolts to a similar flanged sleeve on the end of the other hose section.

Since both sections and their attendant sleeves and disks are practically identical the description given will therefore apply to both.

In forming the joint the studs which enter the key hole slots may be made to bind the two coupling disks together by partially rotating one of said disks and thereby forcing the heads of the studs to ride up the inclined ways of the slots and thus form a tight joint which is rendered more effective by the use of a rubber ring or washer 14 circular in cross section, and fitting in a groove 15 on the inner face of disk 9, disk 13 being provided with a similar groove.

The upper slot of disk 9 extends completely through said disk and is adapted to receive the end of a bolt 16 normally extending thereinto. Bolt 16 is provided with a head 17 and with a coiled retractile spring 18 having one end connected with said head 17 of the bolt and the other end with the outer face of disk 9.

When the corresponding stud 12 enters said slot bolt 16 will be pressed outwardly through said slot by contact with said stud, but when disk 9 is given a partial rotation, the head of said stud will be moved along the slot-way and out of contact with the bolt end which will again move forward through said slot and retain the bolt in place therein. When so locked it will be impossible for the stud to slip or in any way become accidentally released from its slot without first withdrawing the bolt therefrom, when the joint may be loosed by a partial rotation of one of the disks in the reverse direction.

What is claimed, is:—

1. A device of the kind described comprising in combination, a pair of coupling disks, each provided with a series of alternating headed studs and key hole slots, the studs of each disk interlocking with the slots of the opposite disk, one of said disks having an opening formed transversely therethrough and communicating with one of the slots therein, a headed bolt slidable in said opening, and a retractile coil-spring carried by said bolt exteriorly of said disk, for normally forcing the inner end of said bolt into said slot, to retain the corresponding stud of the opposite disk in locked position therein.

2. A device of the kind described comprising in combination, a pair of coupling disks each provided with a series of alternating headed studs and key-hole slots, the latter having inclined internal ways, the studs of each disk interlocking with the slots of the opposite disk, one of said disks having an opening formed transversely therethrough and communicating with one of the slots therein, and a headed bolt slidable in said opening, and a retractile coil-spring carried by said bolt exteriorly of said disk, for normally forcing the inner end of said bolt into said slot, to retain the corresponding stud of the opposite disk in locked position therein, said spring being secured at opposite ends to said disk and bolt head.

In testimony whereof, I affix my signature, in presence of two witnesses.

BERNHARD A. SCHWABE.

Witnesses:
ETTA SARGENT,
G. W. SARGENT.